US010795493B2

(12) United States Patent
Kang et al.

(10) Patent No.: US 10,795,493 B2
(45) Date of Patent: Oct. 6, 2020

(54) PALM TOUCH DETECTION IN A TOUCH SCREEN DEVICE HAVING A FLOATING GROUND OR A THIN TOUCH PANEL

(71) Applicant: STMicroelectronics Asia Pacific Pte Ltd, Singapore (SG)

(72) Inventors: Tae-gil Kang, Seoul (KR); Jay Wang, Seoul (KR)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 63 days.

(21) Appl. No.: 16/011,941

(22) Filed: Jun. 19, 2018

(65) Prior Publication Data

US 2018/0373381 A1    Dec. 27, 2018

Related U.S. Application Data

(60) Provisional application No. 62/522,936, filed on Jun. 21, 2017.

(51) Int. Cl.
*G06F 3/041* (2006.01)
*G06F 3/0488* (2013.01)
*G06F 3/047* (2006.01)
*G06F 3/044* (2006.01)

(52) U.S. Cl.
CPC ............ *G06F 3/0416* (2013.01); *G06F 3/047* (2013.01); *G06F 3/0414* (2013.01); *G06F 3/0418* (2013.01); *G06F 3/0488* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 9,207,822 B1* | 12/2015 | Kremin | G06F 3/044 |
| 2014/0204058 A1* | 7/2014 | Huang | G06F 3/044 |
| | | | 345/174 |
| 2015/0049043 A1* | 2/2015 | Yousefpor | G06F 3/044 |
| | | | 345/174 |
| 2016/0070413 A1* | 3/2016 | Geaghan | G06F 3/0416 |
| | | | 345/174 |

* cited by examiner

*Primary Examiner* — Stephen T. Reed
(74) *Attorney, Agent, or Firm* — Crowe & Dunlevy (57) ABSTRACT

A touch screen controller includes input circuitry receiving touch data from the touch screen. Processing circuitry acquires touch data from the input circuitry in a self-capacitance sensing mode, locates a force island and locates a sense island. A length of the force island and a length of the sense island is calculated. If the length of the force island is greater than a threshold force length and if the length of the sense island is greater than a threshold sense length, then the product of the lengths is calculated, and if greater than a threshold size, designated a valid area. Touch data in the valid area is then acquired in mutual-capacitance sensing mode, and represents palm touch if a maximum strength value in the valid area is less than a maximum area threshold and if a minimum strength value in the valid area is greater than a minimum area threshold.

23 Claims, 5 Drawing Sheets

PALM TOUCH DETECTION IN A TOUCH SCREEN DEVICE HAVING A FLOATING GROUND OR A THIN TOUCH PANEL

RELATED APPLICATION

This application claims the benefit and priority of U.S. Provisional Patent Application Ser. No. 62/522,936, filed on Jun. 21, 2017, and entitled "PALM TOUCH DETECTION IN A TOUCH SCREEN DEVICE HAVING A FLOATING GROUND OR A THIN TOUCH PANEL", the contents of which are hereby incorporated by reference in their entirety.

TECHNICAL FIELD

This application is directed to the field of touch sensing, and, more particularly, to the differentiation between finger touches and palm touches in a touch screen device having a floating ground or a thin touch panel resulting in a low signal to noise ratio.

BACKGROUND

Touch screens are prevalent in today's computing environment. Indeed, touch screen devices such as portable computers, desktop computers, tablets, smart phones, and smartwatches employ a touch screen to gain user input for navigation and control of these devices. Thus, discerning the intent of the user via touch inputs becomes an important feature of a touch screen device. In some instances, however, depending on the shape of the touch screen device being used as well as the use case and/or user's particular method of use, the user may inadvertently place his or her palm on the touch screen while entering touch inputs via a finger. For example, a narrow smartphone may be gripped within the palm of the hand, and the palm may contact the edges of the touch screen. In other instances, the user may even intentionally place his or her palm on the touch screen while entering touch inputs via a finger.

Techniques for differentiating a palm touch from a finger touch are known. These techniques look for a large island of high touch strength values. When the signal to noise ratio is high, such as when the device's ground is at a similar level to the user's ground, or when the spacing between stacked components in the touch screen is relatively thick, these techniques are effective. However, when the device ground is floating with respect to the user's ground, or when the spacing between stacked components in the touch screen is relatively thin (such as is becoming common with smartphones), the signal to noise ratio is low, and the known techniques for differentiating a palm touch from a finger touch do not provide satisfactory results.

Therefore, further development of palm detection techniques is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a touch screen controller operable with a touch screen having force lines and sense lines. The touch screen controller includes input circuitry configured to receive touch data from the touch screen for force lines and sense lines. Processing circuitry is configured to acquire touch data from the input circuitry in a self capacitance sensing mode, locate a force island for the force lines in the touch data having only contiguous strength values that are no less than a force threshold strength value, locate a sense island for the sense lines in the touch data having only contiguous strength values that are no less than a sense threshold strength value, and calculate a length of the force island and a length of the sense island. If the length of the force island is greater than a threshold force length and if the length of the sense island is greater than a threshold sense length, then the processing circuitry determines whether an area formed by multiplying the length of the force island and the length of the sense island is at least a threshold area size and designating that area to be a valid area. The processing circuitry then acquires touch data from the input circuitry in a mutual capacitance sensing mode, and determines the touch data acquired in the mutual capacitance sensing mode and in the valid area to represent a palm touch if a maximum strength value in the valid area is less than a maximum area threshold and if a minimum strength value in the valid area is greater than a minimum area threshold.

The processing circuitry may be further configured to generate a second force threshold strength value as a function of a highest strength value in the force island multiplied by a force normalization percentage, and generate a second sense threshold strength value as a function of a highest strength value in the sense island multiplied by a strength normalization percentage. The processor may also be configured to update the force island such that the force island contains only contiguous strength values that are no less than the second force threshold strength value, prior to calculating the length of the force island, and to update the sense island such that the sense island contains only contiguous strength values that are no less than the second sense threshold strength value, prior to calculating the length of the sense island.

The valid area may be determined to represent a palm touch if a total number of strength values therein being greater than the maximum area threshold are less than a first area threshold number.

The valid area may be determined to represent a palm touch if a total number of strength values therein being less than the minimum areas threshold are less than a second area threshold number.

The area formed by multiplying the length of the force island and the length of the sense island may be designated as an intermediate area bordered by first and second opposing border rows and first and second opposing border columns, and the valid area may be designated to include the intermediate area as well as an additional row of strength values contiguous to each border row and an additional column of strength values contiguous to each border column.

The area formed by multiplying the length of the force island and the length of the sense island may be designated as an intermediate area bordered by first and second opposing border rows and first and second opposing border columns. The valid area may be designated by removing the first and second opposing border rows and the first and second opposing border columns.

The processing circuitry may be configured to determine the force island to be a finger if the length of the force island is less than the threshold force length.

The processing circuitry may be configured to determine the sense island to be a palm touch if the length of the sense island is less than the threshold sense length.

The processing circuitry may be configured to determine the valid area to be a finger touch if a maximum strength value in the valid area is greater than a maximum area threshold or to not be a finger touch if a minimum strength value in the valid area is less than the minimum area threshold.

The force threshold strength value and sense threshold strength value may be equal. The threshold force length and threshold sense length may be equal.

The processing circuitry may be configured to determine the area to not represent a palm touch where the area is not at least the threshold area size.

BRIEF DESCRIPTION OF THE DRAWINGS

FIG. 6A is a chart showing selection of a touch island for determination of whether it represents a palm touch, in accordance with this disclosure.

FIG. 6B is a cut out portion of the chart of FIG. 6A, showing the selected touch island.

FIG. 6C is a chart showing a first optional modification of the touch island of FIG. 6A.

FIG. 6D is a chart showing a second optional modification of the touch island of FIG. 6B.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 1:
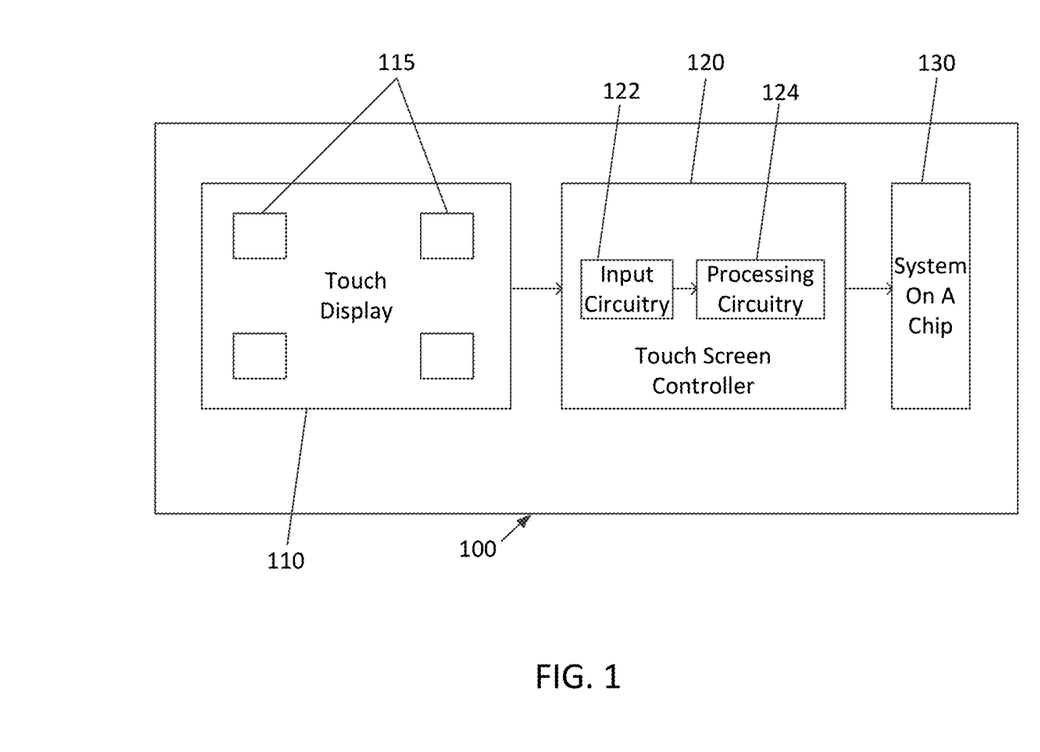
FIG. 1 is a block diagram of a touch screen device in accordance with this disclosure.

Shown in FIG. 1 is a functional block diagram of a touch screen device 100 according to an embodiment as disclosed herein. The touch screen device 100 may be a smartphone, tablet, portable computer, smartwatch, wearable, or other device. The touch screen device 100 includes a tactile input surface, such as a touch display 110, coupled to a touch screen controller 120. The touch display 110 is designed to receive touch inputs from a user through a user's fingers or a stylus. The touch display 110 includes touch screen sensors 115 that are configured to detect touches (or other input actions such as hover or gesture motions) to the touch display 110. As a touch is sensed, the touch screen controller 120 may receive touch signals from the sensors 115 and analyze the touch signal(s). This analysis produces coordinates of the received touch. These coordinates may then be used by a system on a chip (SOC) 130 to manipulate operations respect to applications and programs executing on the touch screen device 100.

In one embodiment, the sensors 115 may be of a single type of sensing technology or sensor, such as self-capacitance sensors or mutual capacitance sensors, to be utilized in the touch screen device 100 to detect input events. In some cases, the same sensors 115 may be used for both self-capacitance sensing and mutual capacitance sensing.

Where the sensors 115 are capacitive sensors, the sensors 115 are typically formed as an array of sensors from transparent patterned orthogonal conductive lines (not shown) formed on the surface, or integrated as part of, the touch display 110. The intersections of the conductive lines form the individual touch sensors 115, and the touch screen controller 120 scans these sensing points and processes the generated signals to identify the location and type of a touch point or points. Thus, the touch display 110 may be considered as a touch map having XY coordinates wherein several touch regions (as defined by a set of XY coordinates) of possible touch information may be generated based on one or more touches to the touch display 110. The coordinates generated above are XY coordinates identifying the location of the touch on the touch display 110.

When operating in mutual capacitance sensing mode, the conductive lines in one direction (for example, vertical) may be force lines onto which a signal is injected, and the conductive lines in the other direction (for example, horizontal) may be sense lines. Therefore, a column in the XY touch map may be considered to be a force channel, whereas a row in the XY touch map may be considered to be a sense channel.

Figure 2:
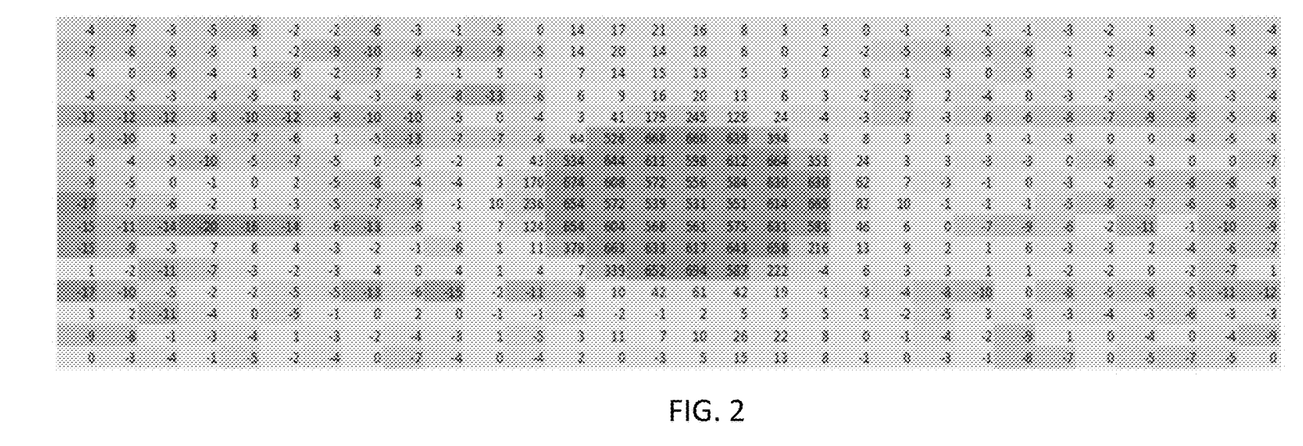
FIG. 2 is a chart showing touch signal strength values during a palm touch on a device with a high signal to noise ratio.
Figure 3:
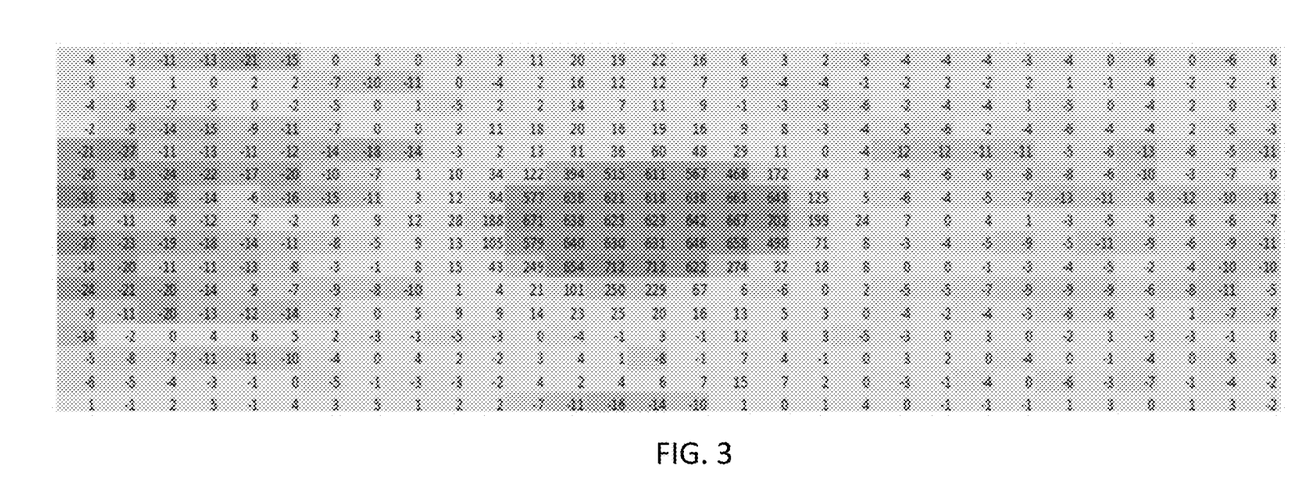
FIG. 3 is a chart showing touch signal strength values during a finger touch on a device with a high signal to noise ratio.

If the touch display 110 of the touch screen device 100 were to have a high signal to noise ratio, detection of a palm touch by operating the touch display in mutual capacitance sensing mode would provide for accurate results. As shown in FIG. 2, in such a mode, a large touch island "A" of contiguous strength values which are substantially higher than surrounding strength values can be identified and known to represent a palm touch. Likewise, as shown in FIG. 3, a smaller touch island "B" of contiguous strength values which are substantially higher than surrounding strength values can be identified and known to represent a finger touch. The differentiator between a palm touch and a finger touch in this case may be the number of strength values in the island, for example, with A having about 40 values and B having about 30 values.

Figure 4:
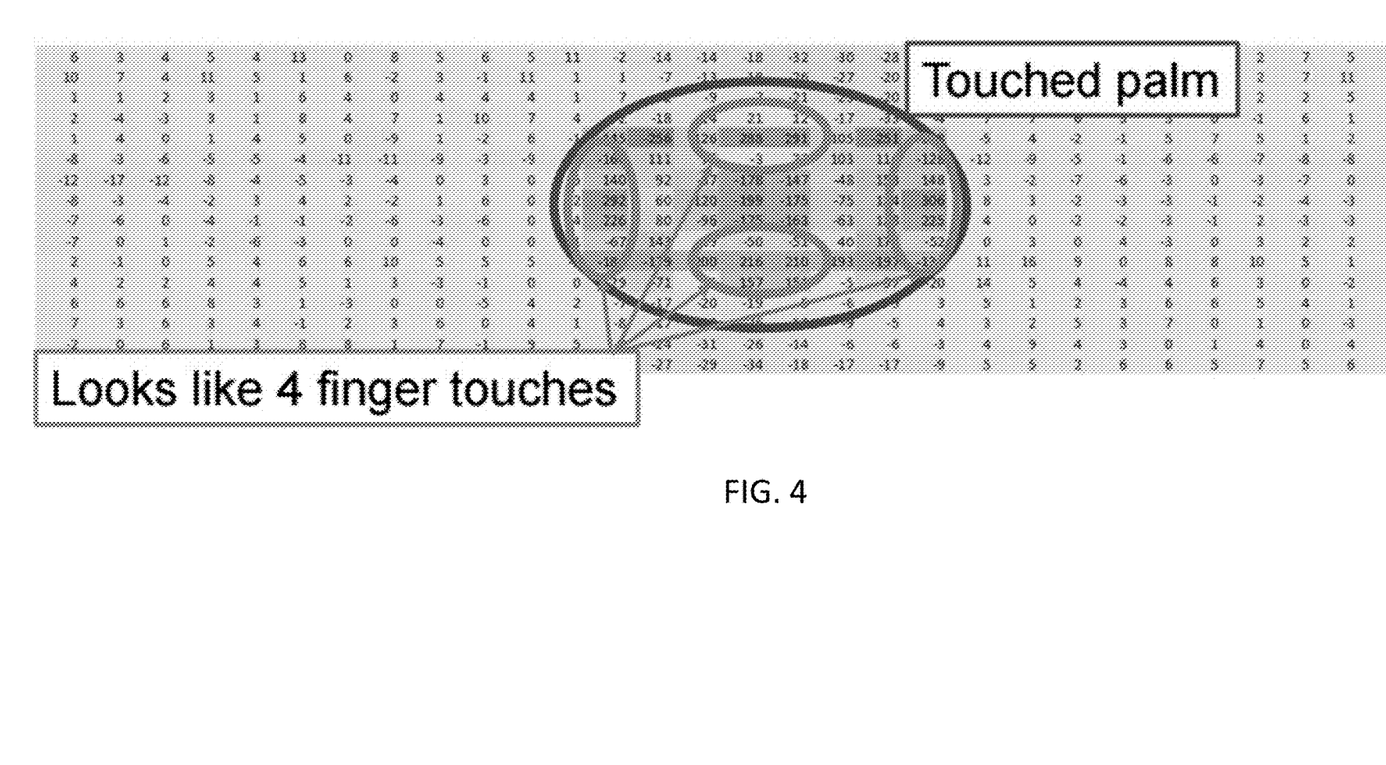
FIG. 4 is a chart showing touch signal strength values during a palm touch on a device with a low signal to noise ratio.

However, if the touch display 110 of the touch screen device 100 has a low signal to noise ratio, the touch island C formed by a palm touch may have a pattern such as shown in FIG. 4. Here, within the touch island C, are regions or sub-islands D of higher strength values, which when using conventional mutual capacitance sensing and processing techniques, can each incorrectly be interpreted to be a finger touch. Thus, despite actually being a palm touch, the island C shown in FIG. 4 could be interpreted to be four separate finger touches. This is undesirable, as it could result in unintended device performance.

Therefore, a new technique has been developed for use in touch screen devices 100 having touch displays 110 with a low signal to noise ratio. This technique involves the use of both self capacitance sensing and mutual capacitance sensing to identify a specific area for analysis, with the results of such analysis accurately differentiating between a finger touch and a palm touch.

Figure 5:
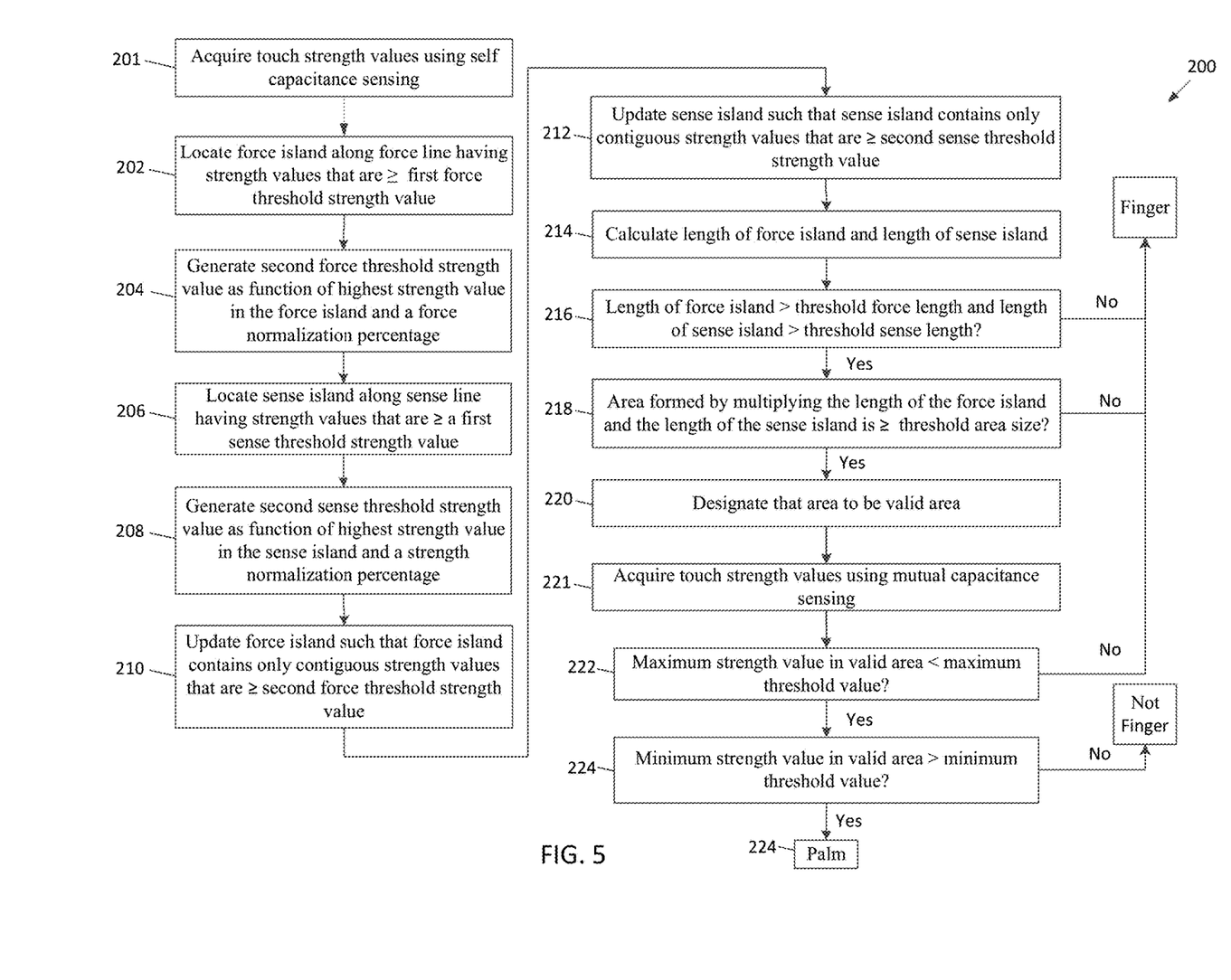
FIG. 5 is a flowchart of a method of operating the touch screen device of FIG. 1 in accordance with this disclosure.

With initial reference to flowchart 200 of FIG. 5, operation of the touch screen controller 120 according to these techniques is now described. After receiving touch strength data from the input circuitry 122 when operating in self capacitance sensing mode (Block 201), the processing circuitry 124 first locates a force island along a force line that has strength values that exceed a first force threshold strength value (Block 202). The processing circuitry 124 then generates a second force threshold strength value (Block 204). This second force threshold strength value can be generated as a function of a highest strength value in the force island multiplied by a force normalization percentage, or can be generated as a sum between (1) a base threshold, and (2) a product of the force normalization percentage and a difference between the highest strength value and the base threshold.

Next, the processing circuitry 124 locates a sense island along a sense line having strength values that exceed a first sense threshold strength value (Block 206), and then generates a second sense threshold strength value (Block 208). This second sense threshold strength value can be generated as a function of a highest strength value in the sense island multiplied by a sense normalization percentage, or can be generated as a sum between a base threshold, and a product of the sense normalization percentage and a difference between the highest strength value and the base threshold.

The force and sense normalization percentages may be equal, or may be different. Likewise, the base threshold for the force island and the base threshold for the sense island may be equal, or may be different.

The processing circuitry 124 then updates the force island such that the force island contains only contiguous strength values that are no less than the second force threshold strength value (Block 210). Similarly, the processing circuitry 124 updates the sense island such that the sense island contains only contiguous strength values that are no less than the second sense threshold strength value (Block 212). The length of the force island and sense island are then calculated (Block 214). By length, it is meant the number of contiguous strength values in the respective force or sense island.

If the length of the force island is less than a threshold force island length, or if the length of the sense island is less than a threshold sense island length, then the touch senses can be considered to be a finger touch (Block 216). The threshold force island length and threshold sense island length may be equal or unequal. If the length of the force island is greater than the threshold force island length and if the length of the sense island is greater than the threshold sense island length, then the lengths are multiplied to determine an area (Block 218). If the area is less than a threshold area size, then the touch is considered to be a finger touch. However, if the area is greater than or equal to a threshold area size, then the processing circuitry 124 designates or considers the area as a valid area (Block 220). A valid area is shown in FIG. 6A and FIG. 6B.

In some cases, the valid area may be decreased by one column on each side and by one row on each side, as shown in FIG. 6C. Alternatively, the valid area may be increased by one column on each side and by one row on each side, as shown in FIG. 6D.

The processing circuitry 124 then, for at least the valid area, acquires touch strength values from the input circuitry 122 using mutual capacitance sensing (Block 221). If the maximum strength value acquired in the valid area using mutual capacitance sensing is greater than a maximum threshold value, then the touch can be considered to be a finger touch (Block 222). If the maximum strength value acquired in the valid area using mutual capacitance sensing is less than a minimum threshold value, then the touch can be considered to be not a finger touch (Block 224). If, however, the maximum strength value is less than the maximum threshold value, and if the minimum strength value is greater than the minimum strength value, then the touch can be considered to be a palm touch (Block 226).

In some cases, instead of the step performed at Block 224, the touch can be considered to represent a palm touch if a total number of strength values therein that are greater than the maximum threshold value is less than a first area threshold number, and/or if a total number of strength values that are less than the minimum threshold value is less than a second area threshold number.

The system on a chip 130 may receive the determination of whether a touch was a finger touch or a palm touch, together with the XY coordinates of said touch, from the processing circuitry 124. In the case where the touch was a finger touch, the system on a chip 130 may execute software functions, such as user interface elements, in response thereto. In the case where the touch was a palm touch, the system on a chip 130 may in some cases ignore or "reject" the palm touch.

It should be understood that the above techniques performed (which can be considered to be a series of specific rules) by the processing circuitry 124 serve to enable the differentiation between a palm touch from a finger touch in touch screen devices where the device ground is floating with respect to the user's hand, or when the spacing between stacked components in the touch screen is relatively thin, which was not previously possible. In fact, the above techniques performed (which as explained can be considered to be a series of specific rules) by the processing circuitry 124 serve to enable the differentiation between a palm touch from a finger touch in touch screen devices with low signal to noise ratios, which was not previously possible. Therefore, these techniques actually improve the functionality of touch displays themselves, and represent a substantial improvement in touch display technology, providing touch screen displays with new functionality they previously lacked, and thereby providing for a tangible, concrete real world result and improvement. Moreover, it is noted that in order to operate a touch display device, the above techniques are performed multiple times per second (and therefore in real time while performing touch sensing), meaning that any such measurements and calculations cannot be performed by a human.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

The invention claimed is:

1. A touch screen controller operable with a touch screen having conductive columns and conductive rows, the touch screen controller comprising:
   input circuitry configured to receive touch data from the touch screen for the conductive columns and the conductive rows; and
   processing circuitry configured to:
      acquire touch data from the input circuitry in a self capacitance sensing mode;
      locate an island for the conductive columns in the touch data having only contiguous strength values that are no less than a first threshold strength value;

locate an island for the conductive rows in the touch data having only contiguous strength values that are no less than a second threshold strength value;

generate a third threshold strength value as a function of a highest strength value in the island for the conductive columns multiplied by a first normalization percentage;

generate a fourth threshold strength value as a function of a highest strength value in the island for the conductive rows multiplied by a second normalization percentage;

update the island for the conductive columns such that the island for the conductive columns contains only contiguous strength values that are no less than the third threshold strength value;

update the island for the conductive rows such that the island for the conductive rows contains only contiguous strength values that are no less than the fourth threshold strength value;

calculate a length of the island for the conductive columns and a length of the island for the conductive rows;

if the length of the island for the conductive columns is greater than a threshold column length and if the length of the island for the conductive rows is greater than a threshold row length, then determine whether an area formed by multiplying the length of the island for the conductive columns and the length of the island for the conductive rows is at least a threshold area size and designate that area to be a valid area;

acquire touch data from the input circuitry in a mutual capacitance sensing mode; and determine the touch data acquired in the mutual capacitance sensing mode and in the valid area to represent a palm touch if a maximum strength value in the valid area is less than a maximum area threshold and if a minimum strength value in the valid area is greater than a minimum area threshold.

2. The touch screen controller of claim 1, wherein the valid area is determined to represent a palm touch if a total number of strength values therein being greater than the maximum area threshold is less than a first area threshold number.

3. The touch screen controller of claim 1, wherein the valid area is determined to represent a palm touch if a total number of strength values therein being less than the minimum areas threshold is less than a second area threshold number.

4. The touch screen controller of claim 1, wherein the area formed by multiplying the length of the island for the conductive columns and the length of the island for the conductive rows is designated as an intermediate area bordered by first and second opposing border rows and first and second opposing border columns; and wherein the valid area is designated to include the intermediate area as well as an additional row of strength values contiguous to each border row and an additional column of strength values contiguous to each border column.

5. The touch screen controller of claim 1, wherein the area formed by multiplying the length of the island for the conductive columns and the length of the island for the conductive rows is designated as an intermediate area bordered by first and second opposing border rows and first and second opposing border columns; and wherein the valid area is designated by removing the first and second opposing border rows and the first and second opposing border columns.

6. The touch screen controller of claim 1, wherein the processing circuitry is configured to determine the island for the conductive columns to be a finger if the length of the island for the conductive columns is less than the threshold column length.

7. The touch screen controller of claim 1, wherein the processing circuitry is configured to determine the island for the conductive rows to be finger palm touch if the length of the island for the conductive rows is less than the threshold row length.

8. The touch screen controller of claim 1, wherein the processing circuitry is configured to determine the valid area to be a finger touch if a maximum strength value in the valid area is greater than a maximum area threshold or to not be a finger touch if a minimum strength value in the valid area is less than the minimum area threshold.

9. The touch screen controller of claim 1, wherein the first threshold strength value and second threshold strength value are equal.

10. The touch screen controller of claim 1, wherein the threshold column length and threshold row length are equal.

11. The touch screen controller of claim 1, wherein the processing circuitry is configured to determine the area to not represent a palm touch where the area is not at least the threshold area size.

12. An electronic device, comprising:
a touch screen having conductive columns and conductive rows; and
a touch screen controller comprising:
input circuitry configured to receive touch data from the touch screen; and
processing circuitry configured to:
a) locate an island for the conductive columns in the touch data of a conductive column having strength values that exceed a first threshold strength value;
b) generate a third threshold strength value as a function of a highest strength value in the island for the conductive columns multiplied by a first normalization percentage;
c) locate an island for the conductive rows in the touch data of a conductive row having strength values that exceed a second threshold strength value;
d) generate a fourth threshold strength value as a function of a highest strength value in the island for the conductive rows multiplied by a second normalization percentage;
e) update the island for the conductive columns such that the island for the conductive columns contains only contiguous strength values that are no less than the third threshold strength value;
f) update the island for the conductive rows such that the island for the conductive rows contains only contiguous strength values that are no less than the fourth threshold strength value;
g) calculate a length of the island for the conductive columns and a length of the island for the conductive rows;
h) if the length of the island for the conductive columns is greater than a threshold column length and if the length of the island for the conductive rows is greater than a threshold row length, then determine whether an area formed by multiplying the length of the island for the conductive columns and the length of the island for the conductive rows is at least a threshold area size and designating that area to be a valid area;

i) determine the valid area to represent a finger touch if a maximum strength value in the valid area is greater than a maximum area threshold;

j) determine the valid area to not represent a finger touch if a minimum strength value in the valid area is less than a minimum area threshold; and k) determine the valid area to represent a palm touch if the maximum strength value in the valid area is less than the maximum area threshold and if the minimum strength value in the valid area is greater than the minimum area threshold.

13. The electronic device of claim 12, wherein the processing circuitry performs steps a), b), c), d), e), f), g), and h) after acquiring the touch data in a self capacitance sensing mode.

14. The electronic device of claim 12, wherein the processing circuitry performs steps i), j), and k) after acquiring the touch data in a mutual capacitance sensing mode.

15. The electronic device of claim 12, wherein the valid area is determined to represent a palm touch if a total number of strength values therein being greater than the maximum area threshold is less than a first area threshold number.

16. The electronic device of claim 12, wherein the valid area is determined to represent a palm touch if a total number of strength values therein being less than the minimum area threshold is less than a second area threshold number.

17. The electronic device of claim 12, wherein the area formed by multiplying the length of the island for the conductive columns and the length of the island for the conductive rows is designated as an intermediate area bordered by first and second opposing border rows and first and second opposing border columns; and wherein the valid area is designated to include the intermediate area as well as an additional row of strength values contiguous to each border row and an additional column of strength values contiguous to each border column.

18. The electronic device of claim 12, wherein the area formed by multiplying the length of the island for the conductive columns and the length of the island for the conductive rows is designated as an intermediate area bordered by first and second opposing border rows and first and second opposing border columns; and wherein the valid area is designated by removing the first and second opposing border rows and the first and second opposing border columns.

19. The electronic device of claim 12, wherein the processing circuitry is configured to determine the island for the conductive columns to not be a palm touch if the length of the island for the conductive columns is less than the threshold column length or if the length of the island for the conductive rows is less than the threshold row length.

20. The electronic device of claim 12, wherein the processing circuitry is configured to determine the valid area to not represent a palm touch if a maximum strength value in the valid area is greater than a maximum area threshold or if a minimum strength value in the valid area is less than the minimum area threshold.

21. The electronic device of claim 12, wherein the first threshold strength value and second threshold strength value are equal; and wherein the threshold column length and threshold row length are equal.

22. The electronic device of claim 12, wherein the processing circuitry is configured to determine the area to not represent a palm touch where the area is not at least the threshold area size.

23. A method of operating an electronic device with a touch screen, the method comprising:

receiving touch data from conductive columns and conductive rows of the touch screen in a self capacitance sensing mode and in a mutual capacitance sensing mode;

determining whether the received touch data indicates a finger touch or a palm touch; and actuating a user interface software function if the received touch data indicates a finger touch but not actuating a user interface software function if the received touch data indicates a palm touch;

wherein determining whether the received touch data indicates a palm touch is performed by:

locating an island for the conductive columns along conductive columns in the touch data acquired in the self capacitance sensing mode having only contiguous strength values that are no less than a first threshold strength value;

locating an island for the conductive rows along conductive rows in the touch data having only contiguous strength values that are no less than a second threshold strength value;

generating a third threshold strength value as a function of a highest strength value in the island for the conductive columns multiplied by a first normalization percentage;

generating a fourth threshold strength value as a function of a highest strength value in the island for the conductive rows multiplied by a second normalization percentage;

updating the island for the conductive columns such that the island for the conductive columns contains only contiguous strength values that are no less than the third threshold strength value;

updating the island for the conductive rows such that the island for the conductive rows contains only contiguous strength values that are no less than the fourth threshold strength value;

calculating a length of the island for the conductive columns and a length of the island for the conductive rows;

if the length of the island for the conductive columns is greater than a threshold column length and if the length of the island for the conductive rows is greater than a threshold row length, then determining whether an area formed by multiplying the length of the island for the conductive columns and the length of the island for the conductive rows is at least a threshold area size and designating that area to be a valid area; and determining the valid area to represent a palm touch if a maximum strength value of the touch data acquired in the mutual capacitance sensing mode and in the valid area is less than a maximum area threshold and if a minimum strength value in the valid area is greater than a minimum area threshold;

wherein the received touch data is determined to indicate a finger touch if the received touch data is not determined to indicate a palm touch.

* * * * *